July 12, 1938.     E. GRUBER     2,123,568
TEMPERATURE RESPONSIVE DEVICE
Filed April 28, 1936
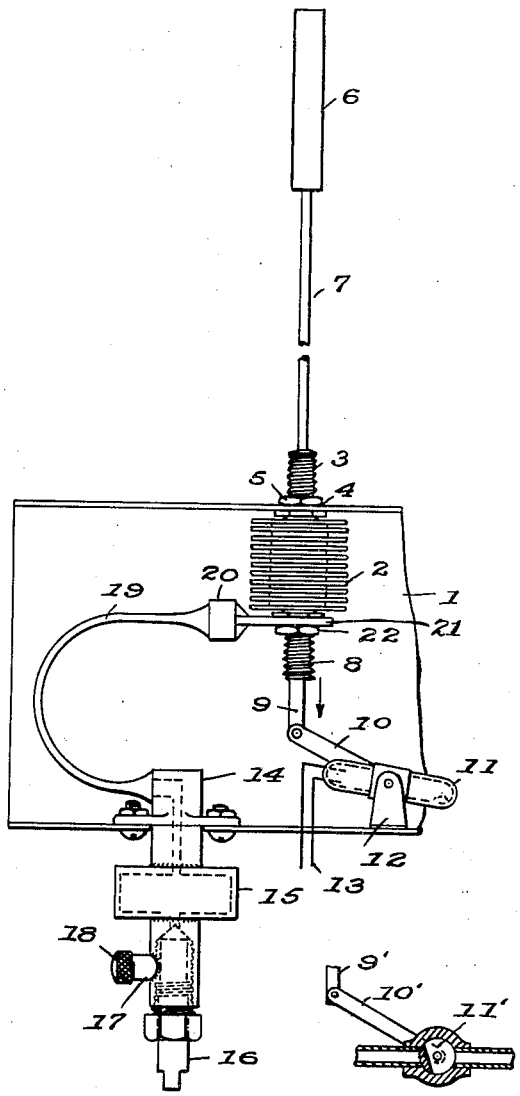
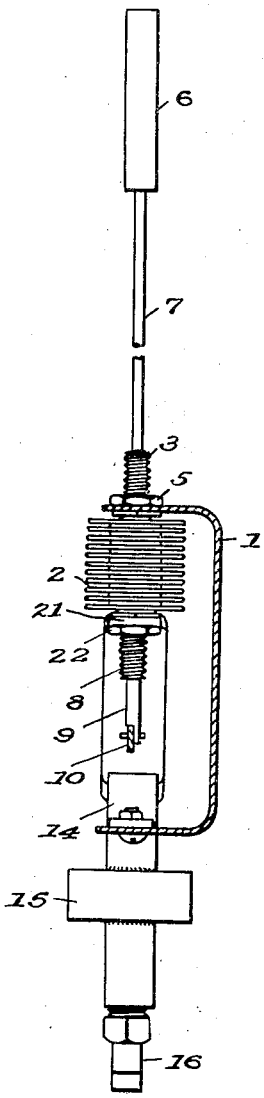
INVENTOR
EDWARD GRUBER
BY
ATTORNEY Patented July 12, 1938

2,123,568

UNITED STATES PATENT OFFICE 2,123,568

TEMPERATURE RESPONSIVE DEVICE

Edward Gruber, Cleveland, Ohio, assignor to Allyne Laboratories, Inc., Cleveland, Ohio Application April 28, 1936, Serial No. 76,861

1 Claim. (Cl. 297—4)

This invention relates to a temperature control for mechanical or absorption type refrigerators. More particularly, the invention pertains to the automatic regulation of a thermostatic control for turning on and closing an electrical circuit maker and breaker for compressor type refrigerators or for automatically regulating thermostatic fuel valves controlling oil or gas to the burner of an absorption cycle refrigerator.

It is old and well-known in the art to use a multiple thermostatic control for refrigerators whereby under uniform room temperature operating conditions a thermostatic device positioned in the food compartment of the refrigerator will open and close a circuit or operate a fuel valve to create an operating cycle of the refrigerating system. It is also old in the art to utilize an additional manually operated control whereby it is possible to initiate the refrigerating cycle depending on the user's diagnosis of room conditions. That is, the operator may initially start the refrigerating cycle when he is conscious that the room temperature has increased prior to the time that the cycle would be commenced by depending simply on the thermostatic control in the refrigerating chamber. Such a secondary control is of great value, particularly when the room in which the refrigerator is housed suddenly becomes warm from atmospheric conditions or from artificial heat, although the great weakness of the system lies in the fact that the secondary control must depend on the judgment of the operator properly gauging the room conditions and, of course, during the absence of the operator the time lag between the increase or decrease of room temperature and the functioning of the refrigerator compartment thermostat may very well result in spoilage of food in the compartment.

Recognizing the inherent disadvantages of the conventional thermostatic control of refrigerating apparatuses, I have invented a novel means of automatically controlling the refrigerating cycle by completely eliminating the necessity of manual operation of the secondary control means so as to obviate any necessity of gauging room temperature. My invention consists of an automatically operated secondary control means which in its broadest aspects permits the primary thermostatic control device in the food compartment to function in its usual manner but hastens the operation of the primary thermostat when room conditions warrant an accelerating of the refrigerating cycle or the retarding of the cycle when the room has become cool.

One form of apparatus which is ideally adapted for these purposes is shown in the accompanying drawing wherein Fig. 1 is a front elevational view of the apparatus with some of the portions thereof in dotted lines; Fig. 2 is a side elevational view partly in cross section; and Fig. 3 is a cross section of a rotary fuel valve.

A U-shaped bracket 1 in which the major parts of the apparatus are supported is positioned on or to any convenient portion of the refrigerator. An expanding corrugated bellows 2 having a hollow screw extension 3 is passed through an opening 4 in the upper portion of the U-shaped bracket 1 and held in rigid position by nut 5. The bellows 2 is connected to a metallic bulb 6 by conduit 7 and the bulb is positioned interiorly of the food compartment of the refrigerator generally adjacent to the evaporator.

A screw threaded stud 8 is affixed to the opposite end of the bellows 2 and terminates in an operating arm 9 pivotally connected to oscillating lever 10 which in Fig. 1 swings a mercury tube switch 11 in and out of circuit making and breaking position. The mercury tube switch 11 is suitably journaled in side arms 12. It will be noted that in Fig. 1 the switch is in off position and that the drop of mercury is not in contact with the electrical leads 13.

Passing through an opening in the lower portion of the bracket 1 and out of line with the bellows is a tubular casing 14 having an enlarged compartment 15. A rotary plug valve 16 is screw threaded into the lower end of the tubular casing 14 to seal off the opening into the chamber 15. A filling tube 17 having a screw threaded cap 18 is provided for adding material into the casing. Adjacent the upper end of the tubular member 14 is connected a flexible Bourdon tube 19 which communicates with the passage formed in the tube 14. The upper end 20 of the Bourdon tube is sealed off and is provided with a perforated disc 21 through which is passed the screw threaded stud 8 and fixedly retained thereon by means of nut 22.

Primary thermostat bulb 6 is filled with any suitable volatile fluid, such as methyl chloride, ammonia or the like which expands under the influence of warmth while the chamber 15 and the Bourdon tube 19 are filled with any suitable material, such as camphor solutions and the like which will become a liquid under the influence of heat but will maintain its crystalline character when cool.

It will be understood that the construction shown in Fig. 1 is for the purpose of opening and closing an electric motor circuit for driving a refrigerant compressor while the rotary valve illustrated in Fig. 3 is utilized for absorption cycle refrigerating machines.

In operation, the fluid in the thermostatic bulb 6 expands under the influence of the rise in temperature in the food compartment of the refrigerator and moves downwardly the operating arm 9 or 9' to either start the compressor unit or turn on the fuel supply valve to generate a refrigerating cycle. This action takes place immediately when the room in which the refrigerator is placed is also warm, for then the Bourdon tube 19 offers practically no resistance to the downward movement of the arm 9 or 9'. However, if the room temperature in which the refrigerator is placed suddenly cools due to atmospheric conditions, it is not necessary for the refrigerating cycle to operate as quickly as when the room is warm, for the coolness of the room is communicated to the refrigerator. When such a room condition exists, the Bourdon tube offers considerable resistance to the operation of the primary expanding bellows thermostat and thus delays its action by retarding or braking the movement of the operating arm and prevents unnecessary operation of the refrigerating apparatus. Naturally, when the warmth in the food compartment continues to rise, the pressure created in the primary thermostat increases and gradually overcomes the Bourdon tube resistance to start the apparatus.

What I claim is:—

A thermostatic control device including a U-shaped bracket adapted to be attached to a refrigerating apparatus, an expanding bellows secured in the upper portion of said bracket, a hollow screw threaded coupling communicating with the interior of said bellows and passing through one arm of said bracket, a flexible tube terminating in a fluid bulb communicating with said coupling, a solid screw threaded stud affixed to the opposite end of said bellows and connected to an operating lever for moving a suitable control device secured thereto, a Bourdon tube thermostat secured in the lower portion of said bracket, said Bourdon tube terminating at its upper end in an apertured disc through which said solid stud and operating lever pass, the lower end of the Bourdon tube being affixed to and in communication with a tubular chamber secured to and depending through the lower edge of the bracket, the depending portion of the tubular chamber being enlarged and terminating in a valve plug.

EDWARD GRUBER.